United States Patent

[11] 3,569,955

[72] Inventor Maurice A. Maniere
Paris, France
[21] Appl. No. 766,823
[22] Filed Oct. 11, 1968
[73] Assignee Lignes Telegraphiques Et Telephoniques
Styled L. T. T.
Paris, France
[32] Priority Oct. 12, 1967
[33] France
[31] 124171

[54] METHOD AND DEVICES FOR CONVERTING CODED BINARY SIGNALS INTO MULTILEVEL SIGNALS AND FOR RECONVERTING THE LATTER INTO THE FORMER

4 Claims, 7 Drawing Figs.

[52] U.S. Cl. 340/347, 325/38
[51] Int. Cl. H04l 3/00
[50] Field of Search 340/347; 325/38 (A)

[56] References Cited
UNITED STATES PATENTS

| | | | |
|---|---|---|---|
| 3,492,578 | 1/1970 | Gerrish | 325/38A |
| 3,456,199 | 7/1969 | Van Gerwen | 325/38A |
| 3,337,863 | 8/1967 | Lender | 325/38A |
| 3,139,615 | 6/1964 | Aaron | 340/347 |

*Primary Examiner*—Thomas A. Robinson
*Assistant Examiner*—Jeremiah Glassman
*Attorney*—Abraham A. Saffitz

ABSTRACT: Code converter for converting a first sequence of coded binary signals $x_n$, each of said signals being formed of $m$ bits, having a given duration and being capable of taking $2^m$ possible values, into a second sequence of multilevel signals $z_n$ whose amplitude has $(2^{m+1}-1)$ possible levels proportional to the series of integers from $-(2^m-1)$ to $+(2^m-1)$ including zero. The converter comprises a register for supplying the signals $x_n$ of the first sequence, a modulo $p$ adder circuit where $p=2^m$ having a first input connected to the register and a second input, said modulo $p$ adder circuit generating a third sequence of $m$-bit binary signals $y_n$, a nonborrow subtractor circuit having a first input being connected to the output of said adder circuit and a second input, a delay circuit having an input connected to the output of the adder circuit for delaying said signals $y_n$ by the duration of the signals $x_n$ and thereby delivering the signals $y_{n-1}$ at the time of occurrence of the signal $x_n$ and an output connected to the second input of both said adder circuit and subtractor circuit. The nonborrow subtractor circuit provides a sequence of $m$-digit signals whose digits are $-1$, 0 and $+1$. Each digit of said $m$-digit signals is multiplied by a coefficient equal to the weight thereof to obtain multilevel components relative to each of said digits and these components are algebraically added. Means for reconverting the multilevel signals $z_n$ into the coded binary signals $x_n$ are also described.

INVENTOR:
Maurice A. MANIERE
By Abraham A. Saffitz
ATTORNEY

INVENTOR:
Maurice A. MANIERE
By Abraham A. Saffitz
ATTORNEY

INVENTOR:

Maurice A. MANIERE

By Abraham A. Saffitz

ATTORNEY

INVENTOR:
Maurice A. MANIERE
By Abraham A. Saffitz
ATTORNEY

METHOD AND DEVICES FOR CONVERTING CODED BINARY SIGNALS INTO MULTILEVEL SIGNALS AND FOR RECONVERTING THE LATTER INTO THE FORMER

This invention generally relates to high speed digital communication systems using multilevel codes and, more particularly, to a process of conversion from a code having $p$ discrete signalling levels to a code having $(2p-1)$ levels and vice versa, and a code converter for carrying out the conversion process.

It is known that high-speed data-transmission systems using binary pulse trains or sequences have two principal inconveniences: the amplitude spectrum of the binary signal has a DC component and there is a poor adaptation of the information to the transmission path.

It is also known that a $p$-level communication system has $\log_2 p$ times greater information capacity than a binary system and eliminates some of the frequencies present in the information before the latter is transmitted.

Methods for use in data-transmission systems for converting binary pulse trains into codes having three levels, $-1$, 0 and $+1$ have been disclosed in the prior art, with the intention of raising the information capacity of the systems and obtaining an amplitude spectrum with a number of frequencies missing therein, particularly the zero frequency.

In the article by P.J. Van Gerwen entitled On the Generation and Application of Pseudo-ternary codes in Pulse Transmission, Philips Research Reports, volume 20, 1965, pages 469 to 484, the author studies the principle of the conversion of a binary sequence $x_n$ into a sequence $z_n$ of signals having the three variances $+1$, 0, $-1$. The generation of the resulting sequence $z_n$ is carried out by the conversion of the original sequence into another sequence $y_n$, also binary, followed by the combination of this with the said sequence, delayed by the duration of one or more bits; this combination is either an analogue subtraction or an analogue addition of the signals. The sequence $x_n$ is decoded from the sequence $z_n$ by full-wave rectification.

Among methods concerning the conversion of binary sequences into sequence with more than three levels, one can mention that set out in the article by A. Lender, entitled Correlative Digital Communication Techniques, published by the Institute of Electrical and Electronic Engineering, International Convention Record, part V March 1964, pages 45 to 53. The author describes there a method for generation of two types of sequences at $b$ levels, obtained from binary sequence, some called "polybinary," the equidistant levels of which are scaled from 0 to $(b-1)$, the others called "polybipolar," the levels of which, the number of which is of necessity uneven, are scaled from $-(b-1)/2$ to $+(b-1)/2$.

The object of the invention is to provide a process and device for converting pulse code modulation signals or in other words coded binary signals expressed in a binary code having ($\log p/\log 2$) bits and consequently capable of representing $p$ distinct integer values from 0 to $(p-1)$ into multilevel signals whose amplitude may assume $(2p-1)$ distinct discrete values, in order to cancel the DC component of the starting signals.

Another object of the invention is to provide means for reconverting the above-defined multilevel signals into coded binary signals.

It will be stated in the following that the coded binary signals have $p$ valences and that the multilevel signals have $(2p-1$In accordance with the invention, the sequence $x_n$ is converted into a first sequence $y_n$ connected with $x_n$ by the equation $$y_n = (x_n + y_{n1}1) \text{ modulo } p \qquad (1)$$

the valences of the sequence $y_n$ being the same as those of $x_n$. The sequence $y_n$ is accordingly completely determined once the level $y_o$ has been arbitrarily selected from among the levels of the sequence $x_n$. Then a further sequence $z_n$ is produced:

$$z_n = y_n - y_{n11} \qquad (2)$$

the levels of $z_n$ being the $(2p-1)$ levels, positive, zero or negative, scaled from $-(p-1)$ to $+(p-1)$:

One deduces from (1) and (2):

$$x_n = z_n \text{ modulo } p \qquad (3)$$

with the result that n $$x_n = z_n + p \quad \text{if } z_n \text{ is negative.}$$

The table below gives the correspondences between the valences of $x_n$, $y_n$, $y_{n11}$ which are binary signals and the levels of $z_n$ which is a multilevel signal. The first column gives the values of $x_n$ from 0 to $(p-1)$; the second column indicates an arbitrary value $h$ for $y_{n11}$, $h$ belonging to the sequence of values 0 to $(p-1)$, and being equal to $$h = \sum_{1}^{n-1} x_n + y_0$$

The third column gives the valences of $y_n = x_n + y_{n11}$

The fourth column gives the valences of $y_n - y_{n11}$ and the fifth and sixth columns give the levels of $z_n$ and $z'_n$ corresponding to the same valence of $x_n$.

Examination of the table shows that in accordance with the value of $x_n$ in relation to the fixed value $h$, the signal $z_n$ which is produced takes either a positive or a zero level, from 0 to $(p-h1)$, or a negative level from $-h$ to $-1$, in fact a total of $p$ possible levels scaled from $-h$ to $(p-h-1)$. Discontinuity takes place for the value $(p-h)$ of $x_n$.

If $p$ equals 4 and $(2p-1)=7$, one has the table or correspondents given below, between the sequence $x_n$ and the sequence $z_n$ in accordance with the values of $h$:

| $x_n$ | $z_n$ | | | |
|---|---|---|---|---|
| | h=0 | h=1 | h=2 | h=3 |
| 0 | 0 | 0 | 0 | 0 |
| 1 | 1 | 1 | 1 | −3 |
| 2 | 2 | 2 | −2 | −2 |
| 3 | 3 | −1 | −1 | −1 |

When one gives to $h$ the various possible values of 0 to $(p-1)$, the function $z_n = y_n - y_{n11}$ can effectively take one of the $(2p-1)$ values of $-(p-1)$ to $+(p-1)$ including zero

TABLE

| $x_n$ | $y_{n-1}$ | $x_n+y_{n-1}$ | $y_n-y_{n-1}$ | $z_n$ | $z'_n$ |
|---|---|---|---|---|---|
| 0 | h | h | 0 | 0 | |
| 1 | h | 1+h | 1 | 1 | −(p−1) |
| 2 | h | 2+h | 2 | 2 | −(p−2) |
| p−h−1 | h | p−1 | p−h−1 | p−h−1 | −(h+1) |
| p−h | h | p | −h | p−h | −h |
| p−h+1 | h | p+1 | −(h−1) | p−h+1 | −(h−1) |
| p−2 | h | p+h−2 | −2 | p−2 | −2 |
| p−1 | h | p+h−1 | −1 | p−1 | −1 |

It is known that the energy spectrum of the sequence $z_n$ does not have continuous component and that its low frequency components are weak if the sequence $x_n$ is a random sequence; the same is true for the recurrence frequency of bits and neighboring frequencies. Beyond this frequency the components of the spectrum are likewise relatively weak by reason of the fact that the energy spectrum of the starting signal $x_n$ has itself fairly weak components in this frequency range.

As concerns the admissible information transmission speed, the conversion of $x_n$ into $z_n$ (from $p$ valences to $2p-1$ levels) does not theoretically bring any gain since the amount of information transmitted for the unit duration of the bit remains the same; one must even admit a certain decrease in the speed realizable in practice since the probability is fairly great that the line noise level will be greater with a higher number of levels; experience shows however that this decrease is limited.

The proposed system offers approximately the same advantages over binary transmission as does transmission at $p$ levels in so far as speed of transmission of information is concerned. It also offers a further advantage over transmission at $p$ levels in that its frequency spectrum is more suitable for line transmission.

Other characteristics and advantages of the invention will become apparent and the method in accordance with the invention as well as the structure and functioning of the devices for putting into operation, will be better understood on reading the description which follows and on examining the attached drawings in which.

Figure 1:
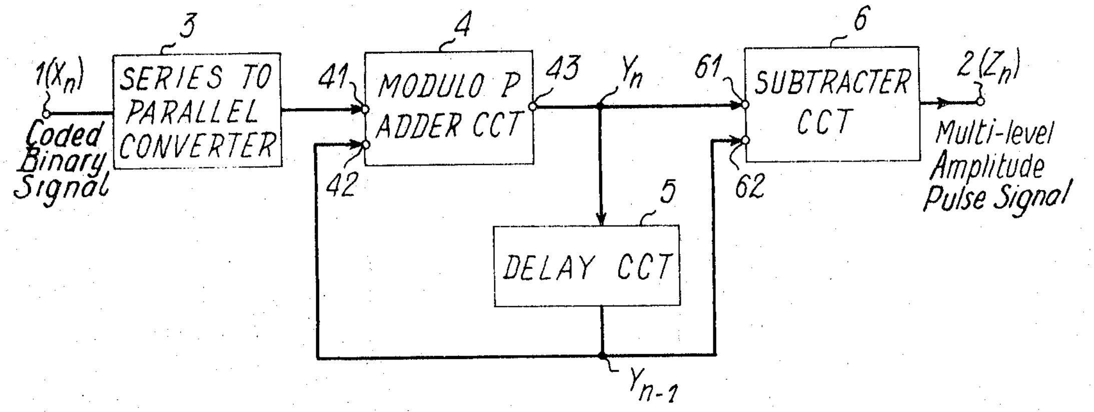
FIG. 1 shows, in the form of a block diagram, the code converter in accordance with the invention.

Referring to FIG. 1, number 3 designates a series -parallel converter to the input terminal 1 of which a sequence of signals $x_n$ is applied. Each signal of the sequence is a coded binary signal with several bits. The number of bits is two in the example disclosed. The block 4 represents a modulo $p$ addition circuit of the signals applied to its inputs. To the input 41 the sequence $x_n$ is applied in parallel form, and to the input 42 the sequence $y_{n1l}$, also in parallel form. The output 43 of the adder 4 at which the sequence $y_n$ is obtained is connected to the input of a delay circuit 5 and to one of the inputs 61 of a subtraction circuit 6. The output of the delay circuit 5 is connected to the second input 62 of the subtraction circuit 6 and to the second input 42 of the addition circuit. The delay of the delay circuit 4 is equal to the duration of two bits or more generally to the duration of the bits forming each signal $x_n$. At the output 2 of the circuit 6 the sequence $z_n$ is obtained.

As has been stated, the signals of sequences $x_n$ and $y_n$ are coded binary signals two bits. The two bits of each signal of the sequence $x_n$ will be designated by $a_o$ and $a1$ and the two bits of the sequence $y_n$ by $b_o$ and $b_1$. *1 If it is desired to indicate the number n* of the signal in the sequence, a second subscript $n$ will be alloted, and the bits will be designated by $a_{on}, a_{1n}, b_{on}, b_{1n}$.

Figure 2:
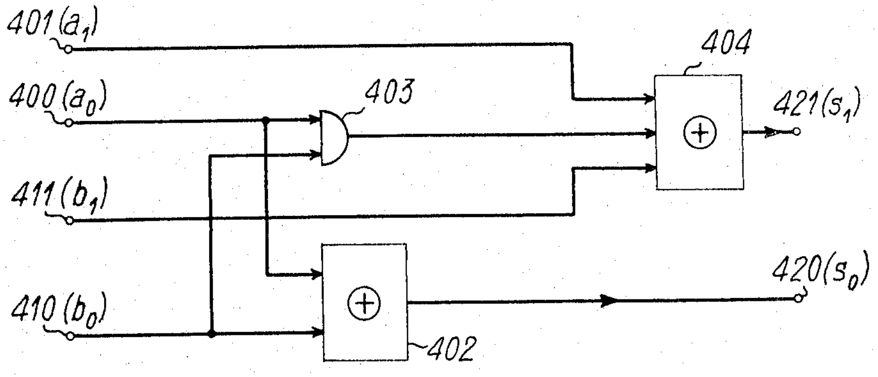
FIG. 2 shows the functional diagram of an electronic circuit carrying out a modulo 4 addition.

FIG. 2 shows in the form of a block diagram a modulo 4 addition circuit of two binary numbers with two bits $a1\ a_o$ and $b1\ b_o$, the decimal value of which is accordingly between 0 and 3. The modulo 4 sum is a binary number with two figures $s1\ s_o$ such that $s_o = a_o + b_o$ $s1 = a1 + b1 + (a_o \cdot b_o)$ where the sign + designates the modulo 2 addition and the sign · the logical product of two binary figures.

The binary figures $a_o$, $a_1$, $b_o$, $b_1$ are applied respectively to terminals 400, 401, 410, 411 of the adder 4 shown in FIG. 1. The terminals 400 and 410 are connected to an exclusively-OR gate 402 and to an AND gate 403. The exclusively-OR gate 402 carries out the modulo 2 addition of the signals $a_o$, $b_o$, i.e. supplies the signal $a_o + b_o$. The AND gate 403 effects the product $(a_o \cdot b_o)$. The terminals 401 and 411 and the output of the gate 403 are connected to the inputs of an exclusively-OR gate 404. This gate effects the modulo 2 addition of $a_1$, $b1$ and $(a_o \cdot b_o)$. At the two terminals 420 and 421 there appear the numbers $s_o$ and $s_l$. Of course, the functioning of the modulo 4 adder which has just been described requires that the pulses representing the bits be applied simultaneously to the inputs, i.e. in parallel.

Figure 4:
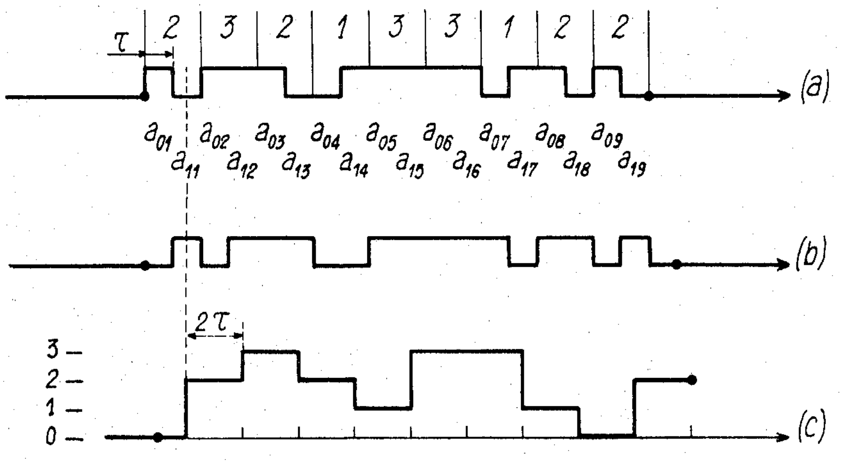
FIG. 4 is a diagram of signal waveforms for explaining the operation of the code converter.

FIG. 4 line $a$, shows, in the form of non return to zero bits, a sequence $x_n$ of signals each with two bits. Above each signal its decimal value has been indicated.

FIG. 4 line $b$, shows the sequence of the line $a$ delayed by the duration $\tau$ of one bit.

FIG. 4 line $c$, shows the signal of valence 4 which has been obtained by adding samples of the signals of lines $a$ and $b$, scaled from $2\tau$ to $2\tau$ and coinciding substantially with the center of the bit.

FIG. 4 shows that the signal of the line $a$ is equivalent to the signal of the line $c$ but the converter of the invention does not require the actual production of the signal of the line $c$.

Figure 3:
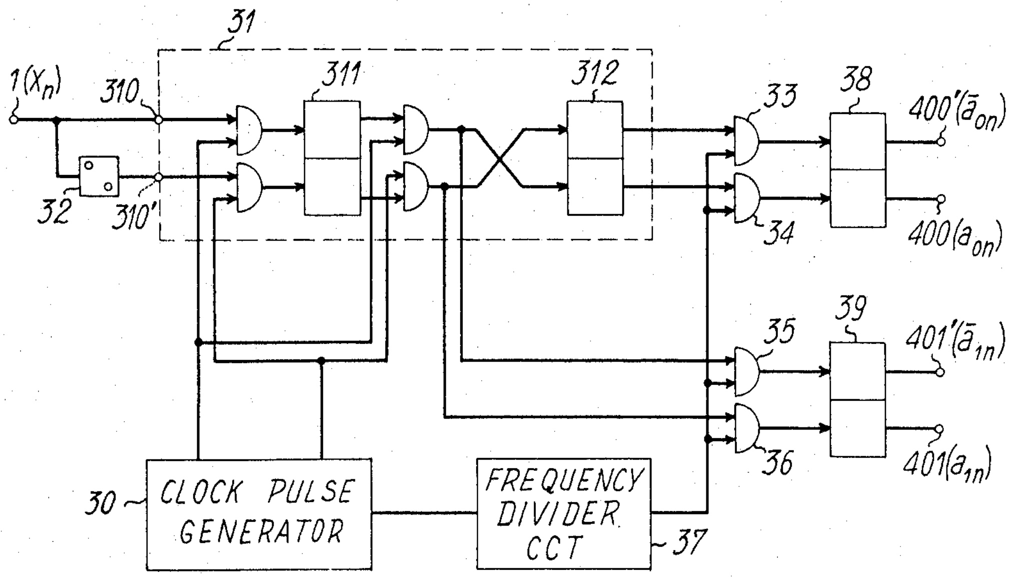
FIG. 3 shows a series -parallel converter used in the code converter of the invention.

FIG. 3 shows the series–parallel converter 3. It comprises a shift register 31, here with two stages 311 and 312 since each coded binary signal has only two bits. The sequence $x_n$ of coded binary signals is applied to the input 310 of the shift register 31 and the sequence $\bar{x}_n$ is applied to the input 310′ via an inverter 32. A time-base 30 of frequency $1/\tau$ controls the advance of the shift register 31. The outputs of the stages 311 and 312 of the register are connected respectively to four AND gates 33, 34, 35, 36 which are controlled by the time-base 30 via a frequency divider by two 37. The outputs of the gates 33, 34 are connected to the inputs of a trigger 38 and the outputs of the gates 35, 36 are connected to the inputs of a trigger 39. At the outlet 400 the signal $a_{on}$ is obtained, at the outlet 400′ the signal $\bar{a}_{on}$, at the outlet 401 the signal $a_{1n}$ and at the outlet 400′ the signal $\bar{a}_{1n}$.

Taking into account the fact that the binary signals $x_n$, $y_n$, $y_{n11}$, which are coded binary signals with two bits, are written as:

$x_n = a_{1n}\, a_{on}$ $y_n = b_{1n}\, b_{on}$ $y_{n11} = b_{1(n11)}\, b_{o(n11)}$ the equation (1) is written as:

$b_{on} = a_{on} + b_{o(n11)}$ (4)

$b_{1n} = a_{1n} + b_{1(n11)} + a_{on} \cdot b_{o(n11)}$ (5)

It follows that $z_n$, which is equal to the analogue difference $y_n - y_{n11}$, is expressed as a decimal number:

$z_n = 2\,[b_{1n} - b_{1(n11)}] + [b_{on} - b_{o(n11)}]$

Figure 5:
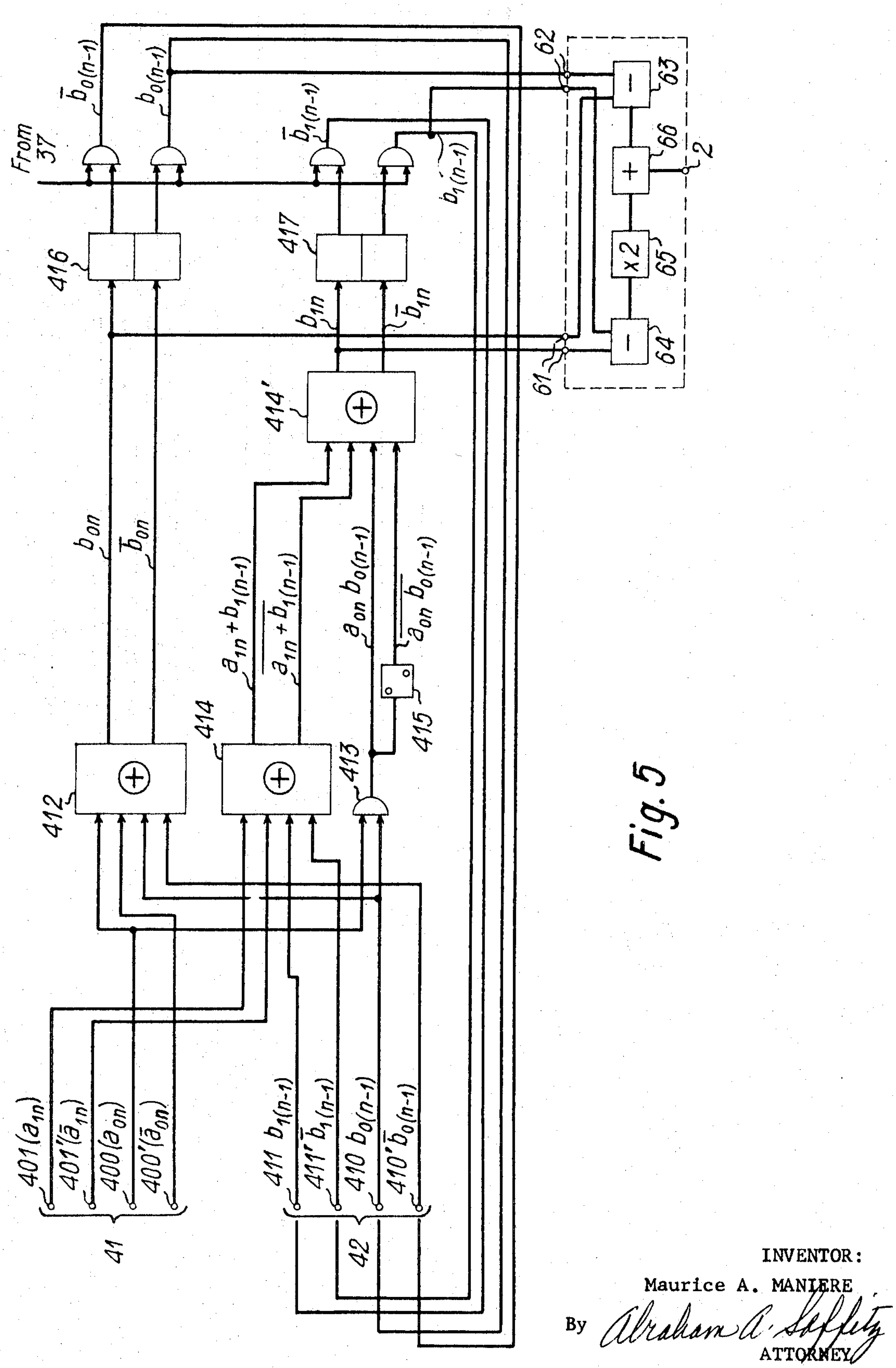
FIG. 5 shows in a detailed way the code converter between codes having different numbers of combinations, the number of combinations of the output code being 7 and that of the input code being 4.

FIG. 5 shows in detail the circuits 3, 4, 5, an 6 shown in FIG. 1. The modulo $p$ addition circuit 3 has in FIG. 5 substantially the same structure as in FIG. 2; nevertheless the exclusive-OR gate 404 which has three inputs in FIG. 2 is replaced by two gates 414 and 414′ with each two inputs in FIG. 5. The signals $a_{on}$, $\bar{a}_{on}$, $a_{1n}$, $\bar{a}_{1n}$ are applied respectively to terminals 400, 400′, 401, 401′. The terminals 400 and 400′ are connected to an exclusive-OR gate 412 which also receives the signals $b_{o(n11)}$ and $\bar{b}_{o(n11)}$. It will be seen later on how these are produced.

This gate 412 is equivalent to the gate 402 shown in FIG. 2 and at its outputs are found the signals $b_{on}$ and $\bar{b}_{on}$. The signals $b_{o(n11)}$ and $a_{on}$ are also applied to AND gate 413 which plays the role of the gate 403 shown in FIG. 2. At the direct output of the gate 413 is found the signal $(a_{on} \cdot b_{o(n11)})$ and, at the outlet comprising an inverter 415, the signal $\overline{a_{on} \cdot b_{o(n11)}} = \bar{a}_{on} + \bar{b}_{o(n11)}$.

The signal $a_{1n}$ and $b_{1(n11)}$ on the one hand and $a_{1n}$ and $b_{1(n11)}$ on the other hand are added in the exclusive-OR gate 414 in such a way as to give;

$a_{1n} + b_{1(n11)}$ and $\overline{a_{1n} + b_{1(n11)}}$

These latter signals are added respectively to the output signals of the AND gate 413 in the exclusive-OR gate 414′. At the output of the exclusive-OR gate 414′ there is obtained the signal $b_{1n}$, the expression of which is given by the equation (5) and its complement. (n 1) The signal $b_{on}$ and $\bar{b}_{on}$ issuing from the gate 412 and the signal $b_{1n}$ and $\bar{b}_{1n}$ issuing from the gate 414′ are applied respectively to registers 416 and 417. As each signal has only one bit, each register can be a trigger. It is better, however, for uncoupling the output and the input of the registers, for these to comprise two stages. The advance of these registers is controlled by clock pulses issuing from the frequency divider 37. At the outlet of the registers 416 and 417, are obtained respectively the signals $b_{o(n11)}$ and $\bar{b}_{o(n11)}$, the one hand and $b_{1(n11)}$ and $\bar{b}_{1(n-1)}$ on the other hand, which are supplied to the imputs of 412, 413, 414 as has been stated.

The signal $b_{on}$ and $b_{o(n11)}$ are subtracted in the subtraction circuit 63 and the signal $b_{1n}$ and $b_{1(n11)}$ are also subtracted in the subtraction circuit 64. The Circuit 65 is a circuit which doubles the amplitude of the signal issuing from 64, and the circuit 66 is an addition circuit which adds the signals issuing from the circuits 63 and 65.

At the output terminal 2 the signal $z_n$ is obtained, the seven possible levels of which are:

$-3\ -2\ -1\ 0\ +1\ +2\ +3$

Figure 6:
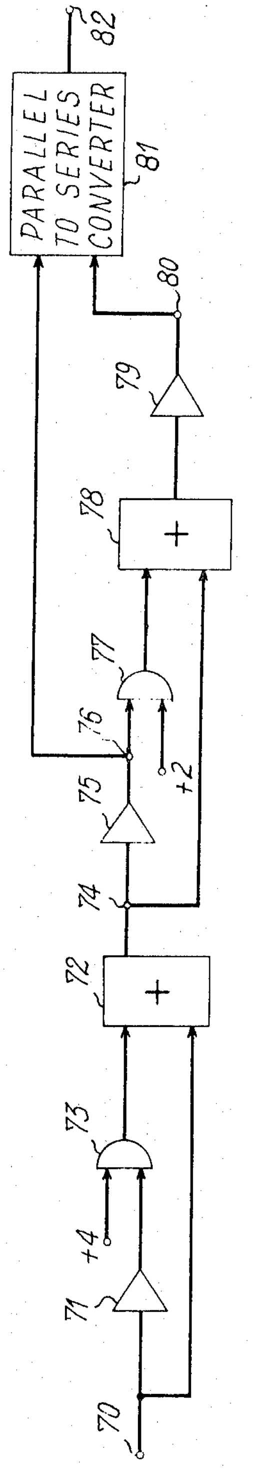
FIG. 6 shows a second code converter, operating in the reverse way to that shown in FIG. 5.

FIG. 6 shows a code converter for converting the sequence of signals $z_n$ to a sequence of signals $x_n$.

The signal $z_n$ is applied to the terminal 70, which is connected to a limiting circuit 71, such as a threshold amplifier, and also to an analogue adder 72. The threshold $S_o$ of the circuit 71 is lower than the level 1 of the signal $z_n$, for instance equal to half this level. Accordingly there issues from the circuits 71 a signal of fixed amplitude $S_o$ which is applied to the input of an AND gate 73, the other input 99 of which is connected to a source of potential of value +4. The gate 73 allows current to pass for the signal of level +4 if the signal of level $S_o$ is negative, i.e. if $z_n$ before clipping has levels −3, −2 or −1 and the gate 73 is blocked, its output remaining at zero potential, if $S_o$ is positive, i.e. if $z_n$ before clipping off has levels o, 1, 2 or 3.

The output of gate 73 is connected to the second input of adder 72. The signal obtained at the output of 73 is equal to $(z_n+4)$ if $z_n$ is equal to −3, −2 or −1, and to $z_n$ if $z_n$ is equal to 0, 1, 2, or 3. The signal which appears at terminal 74 of gate 73 is accordingly the signal of the line *c* of FIG. 4, where $x_n$ is a multilevel signal and not a coded binary signal. The complementary part of the converter, to the right of the terminal 74 in FIG. 6, enables the signal applied to the said terminal to be converted into a coded binary signal of two bits.

A limiting circuit 75, a threshold amplifier for instance, whose threshold $S_1$ is between the levels 1 and 2 of the signal $x_n$, supplies to its output terminal 76 a signal which is positive and of constant amplitude if $x_n$ is greater than $S_1$, i.e. has levels 2 or 3, and which is zero if $x_n$ is less than $S_1$, i.e. has levels 0 or 1. This signal is accordingly the bit of weight 1 of $x_n$. The terminal 76 is connected to the input of an AND gate 77, whose second input is connected to a source of potential of value +2. The gate 77 is passing for the signal of level +2 if the signal issuing from 76 is zero, and is blocked if this signal is positive. The output of the gate 77 is accordingly at potential +2 when $x_n$ has levels 0 or 1, and at potential 0 when $x_n$ has levels 2 or 3. Circuit 78 is an adder which adds $x_n$ and +2 and circuit 79 is a threshold amplifier whose threshold $S_2$ is between the levels 2 and 3 of $x_n$. The output signal at terminal 80 is accordingly the bit of weight zero of $x_n$.

The terminals 76 and 80 are connected to a series–parallel converter 81, and at the terminal 82 there is obtained the signal $x_n$ which was applied to the terminal 1 in FIG. 1.

Figure 7:
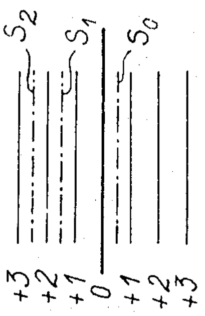
FIG. 7 is a diagram of signals for explaining the operation of the second code converter.

FIG. 7 shows the position of the thresholds $S_o$, $S_1$, $S_2$ in relation to the signal $x_n$ (multilevel signal and not binary signal).

Although there has only been disclosed in detail the case in which binary signals with two bits and four possible values are converted into multilevel signals with seven possible levels, it is easy for those skilled in the art to design converters for converting *m*-bit binary signals with $p = 2m$ possible values (including the zero value) into multilevel signals with $(2p-1)$ levels. In the case of three bits, for example, $x_n$ and $y_n$ may be written:

$$x_n = a_{2n}\, a_{1n}\, a_{on}$$
$$y_n = b_{2n}\, b_{1n}\, a_{on}$$

and the formulae of addition (4) and (5) become $$b_{on} = a_{on} \text{ on} + b_{o(n11)})$$
$$b_{1n} = a_{1n} + b_{1(n11)} + [a_{on} \cdot b_{o(n11)}]$$
$$b_{2n} = a_{2n} + b_{2(n11)} + [a_{1n} + b_{1(n11)}][a_{on} \cdot b_{o(n1)}]$$
$$[+ \ a_{1n} \cdot b_{1(n11)}]$$

Circuits for the addition of two three-digit or *m*-digit numbers are known in the art and for example described in the textbook Boolean Algebra and its Applications by J. Eldon Whitesitt, Addison-Wesley Publishing Company, Inc., 1961, page 144 and FIGS. 6 to 8. They generally comprise a first half-adder for each binary weight (such as that formed by 412-—413) giving the sum digit of the bits of this weight in the first and second addend and the carry digit and a second half-adder receiving the sum digit of the corresponding weight and the carry digit from the preceding weight. The sum of this second half-adder is the second digit of the sum number and the carry from the two half-adders are combined with an OR element to give the carry for the next higher weight.

I claim:

1. A process for converting a first sequence of coded binary signals $x_n$, each of said signals being formed of *m* bits, having a given duration and being capable of taking $2^m$ possible values, into a sequence of multilevel signals $z_n$ whose amplitude has $(2^{m+11})$ possible levels equal to the series of integers from $-(2^m a/1)$ to $+(2^m-1)$ including zero, and for reconverting said signals $z_n$ into said signals $x_n$, said process comprising a first main step of deriving from the first sequence of signals $x_n$, a second sequence of coded binary signals $y_n$ having *m* bits related to the signals $x_n$ by the relationship;

$$y_n = x_n + y_{n11} \text{ modulo } p \text{ with } p = 2^m$$

said first main step including a first partial step of delaying the signals $y_n$ by the duration of the signals $x_n$ for obtaining the signal $y_{n11}$ and the second partial step of adding with modulo *p* the signals $x_n$ and $y_{n11}$, a second step of analogically subtracting the *m*-bit signals $y_n$ and $y_{n11}$ thereby obtaining resulting *m*-bit signals the digits of which are −1, 0 and +1 and a third step of translating said resulting *m*-bit signals the amplitude of which is equal to the binary value of said *m*-bit signals; said reconverting process including a first step of detecting the sign of the signals $z_n$, a second step of adding to those of the signals $z_n$ which are negative a signal whose amplitude represents the value $2^m$ and a third step of translating into the binary code the amplitude of the positive signals $z_n$ and the amplitude of the negative signals $z_n$ increased by $2^m$.

2. A code converter for converting a first sequence of coded binary signals $x_n$, each of said signals being formed of *m* bits, $a_{(m11)n} a_{2n}, a_{1n}, a_{0n}$, having a given duration and being capable of taking $2^m$ possible values, into a second sequence of multilevel signals $z_n$ whose amplitude has $(2^{m+1}-1)$ possible levels equal to the series of integers from $-(2^m-1)$ to $+(2^m-1)$ including zero, comprising a *m*-stage register for supplying in parallel the digits of the signals $x_n$ of the first sequence, an *m*-stage adder circuit having a first and a second set of *m* input terminals and a set of *m* output terminals, the input terminals of the first set receiving digits $a_{(m11)}, \ldots a_{2n}, a_{1n}, a_{0n}$ and the input terminals of the second set receiving the digits $b_{(m11)(n11)}, \ldots b_{2(n11)}, b_{1(n11)}, b_{0(n11)}$ of a signal $y_{n11}$ generated within the converter and the output terminals providing the digits $b_{(m11)n}, \ldots b_{2n}, b_{1n}, b_{0n}$ to the exclusion of the digit $b_{mn}$ of a signal $y_n$ equal to the sum modulo *p*, where $p = 2^m$, of $x_n$ and $y_{n11}$, a nonborrow subtracter circuit having a first and a second set of *m* input terminals, the input terminals of the first set being respectively connected to the output terminals of said adder circuit, a delay circuit having a set of *m* input terminals respectively connected to the output terminals of said adder circuit for delaying the digits of the signals $y_n$ by the duration of the signals $x_n$ and thereby delivering the digits of the signals $y_{n11}$ at the time of occurrence of the digits of the signal $x_n$ and a set of output terminals connected to the input terminals of the second set of both said adder circuit and subtracter circuit, said nonborrow subtracter circuit providing a sequence of *m*-ternary-digit signals whose digits are −1, 0 and +1, means for multiplying each digit of said *m*-ternary-digit signals by a coefficient equal to the weight thereof and thereby obtaining multilevel components relative to each of said digits, and means for algebraically adding said multilevel components relative to the *m* digits of a signal.

3. A code converter for converting a first sequence of coded binary signals $x_n$, each of said signals being formed of *m* bits, having a given duration and being capable of taking $2^m$ possible values into a second sequence of multilevel signals $z_n$ whose amplitude has $(2^{m+1}-1)$ possible levels equal to the series of integers from $-(2^m-1)$ to $+(2^m-1)$ including zero, comprising a time base generating clock pulses, a first register controlled by said time base for supplying in parallel the bits of the signals $x_n$ of the first sequence, a modulo *p* adder circuit where $p = 2^m$ having a first and a second input, the first input being connected to said register, said modulo *p* adder circuit generating a third sequence of *m*-bit binary signals $x_n$, a nonborrow subtracter circuit having a first and a second input, the first input being connected to the output of said adder circuit, a second register having an input connected to the output of said adder circuit and an output, controlled by said time base synchronously with said first register and connected to the second input of both said adder circuit and subtracter circuit, whereby the signals $y_n$ are delayed by the duration of the signals $x_n$, said nonborrow subtracter circuit providing a sequence of $m$-digit signals whose digits are −1, 0 and +1, means for multiplying each digit of said $m$-digit signals by a coefficient equal to the weight thereof and thereby obtaining multilevel components relative to each of said digits, and means for algebraically adding said multilevel components relative to the $m$-digits of a signal.

4. A code converter for converting a sequence of multilevel signals $z_n$ whose amplitude has $(2^{m+}11)$ possible levels proportional to the series of integers from $-(2^m-1)$ to $+(2^m-1)$ including zero into a sequence of coded binary signals $x_n$, each of latter said signals being formed of $m$ bits and having $2^m$ possible values, comprising means for detecting the sign of the signals $z_n$ of the first sequence, adder means for adding only to those of the signals $z_n$ which are negative a signal whose amplitude is proportional to the value $2^m$ and means for coding into the binary code the amplitude of the positive signals $z_n$ and the amplitude of the negative signals $z_n$ increased by a quantity proportional to $2^m$.